Patented Oct. 6, 1936

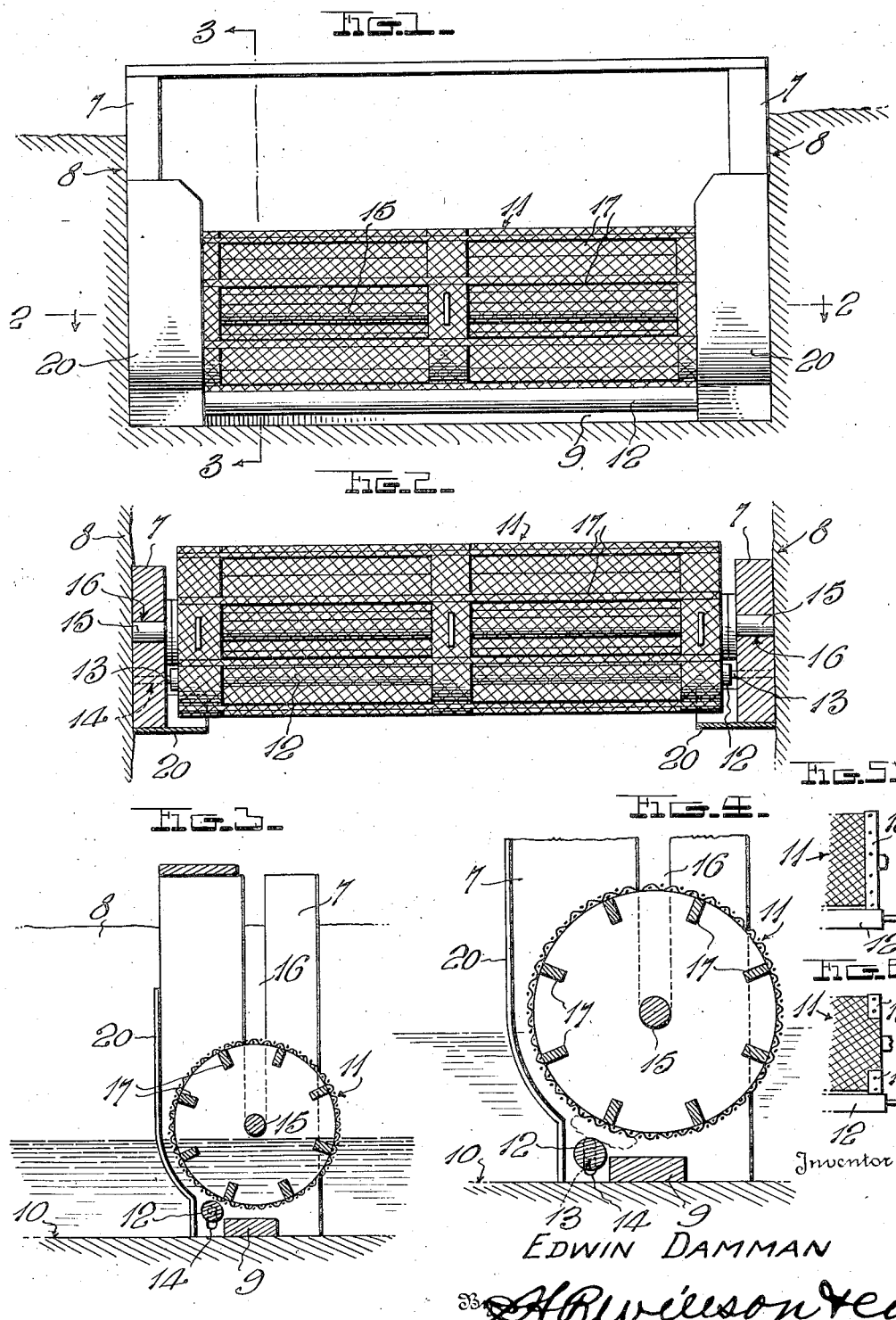

2,056,445

UNITED STATES PATENT OFFICE 2,056,445

SELF-CLEANING FISH SCREEN

Edwin Damman, Twin Falls, Idaho

Application January 15, 1936, Serial No. 59,306

5 Claims. (Cl. 210—173)

The invention relates to improvements in fish screens for use across spillways to prevent fish and the like from traveling either upstream or downstream past the screen, and the invention aims to provide a new and improved screen which will be self-cleaning of all floating debris coming in contact with it, even to the extent of passing unusually large pieces.

With the foregoing in view, the invention resides in the novel subject matter hereinafter described and claimed, description being accomplished by reference to the accompanying drawing.

Fig. 1 is an elevation showing the upstream side of the screen, the spillway being shown in section.

Fig. 2 is a horizontal sectional view on line 2—2 of Fig. 1, the screen however being in elevation.

Fig. 3 is a sectional view on line 3—3 of Fig. 1.

Fig. 4 is an enlarged sectional view similar to a portion of Fig. 3 but illustrating the manner in which pieces of debris are passed by the screen.

Figs. 5 and 6 are fragmentary elevations showing modifications to be hereinafter described.

A preferred construction has been illustrated and will be rather specifically explained, with the understanding however, that within the scope of the invention as claimed, variations may be made.

I provide two standards 7 for anchorage at the opposite side walls 8 of a spillway, the lower ends of these standards being connected by a fixed transverse member 9 which lies upon the spillway bottom 10 and may, if desired, be in the form of a dam board. A cylindrical, undershot, water-driven screen 11 extends between the standards 7 and is spaced upwardly from the transverse member 9, and a roller 12 extends between said standards 7 at the upstream side of said member 9, said roller being positioned to substantially close the space between said screen and said member 9 to prevent fish and the like from passing through said space. In order that debris and the like caught upon the upstream side of the screen 11 and rotating therewith, shall be permitted to freely pass between said screen and the roller 12, this roller is constructed from wood or is otherwise made buoyant, to normally maintain proper relation with the screen, yet is mounted in such manner that it may be depressed by the material rotating with the screen. In accomplishing this, I prefer to provide the roller 12 with trunnions 13 received in short vertical slots 14 in the standards 7. When the trunnions 13 are at the upper ends of the slots 14, the roller 12 preferably does not quite touch the screen 11 so that fine material rotating with said screen, can pass above the roller without depressing the latter. Thicker material, however, upon encountering the roller, depresses the latter and the material is allowed to freely pass. When the roller is fully depressed, it is still somewhat above the upper side or edge of the transverse member 9, preventing any material from lodging against the latter.

In order that any unusually large pieces of floating material caught by and rotating with the screen 11, may pass between said screen and the roller 12, I mount said screen in such manner that it may shift upwardly. In the present showing, the screen 11 includes a central shaft 15 whose ends constitute trunnions and are received in vertical slots 16 formed in the standards 7. All material caught by the upstream side of the screen 11 and carried to the downstream side thereof, is washed from said screen by the flow of water through the latter, and in order that this water shall rotate the screen as an undershot water wheel, the screen is never entirely submerged so that the water pressure on its internal paddles 17 will not be equalized both above and below center, but will be greater below center.

If desired, the ends of the screen may be provided with rubber bands or the like 18 or with arcuate rubber strips or the like 19, said bands or strips being adapted to contact with the roller 12 to drive the latter. Continuous bands 18 will drive the roller continuously but spaced strips such as 19 will intermittently rotate said roller, either or both of which operations may be advantageous under certain circumstances.

It will be seen from the foregoing that a novel and advantageous construction has been provided to prevent fish and the like from passing the screen in either direction, and that the device operates perfectly to freely pass any floating debris which is stopped by contact with the screen. Such debris rotates with the screen and passes between said screen and the roller 12, said roller yielding downwardly in some instances while in others, the roller yields downwardly and the screen upwardly. All material carried to the downstream side of the screen is washed from contact with the latter by the flowing water.

If desired, suitable shields 20 may be secured to the standards 7 at the upstream side of the screen 11 in overlapping relation with the latter to prevent small fish from seeing space between the screen and the standards and attempting to pass therethrough. At this point, it may also be stated that the roller 12 prevents the fish from seeing the space existing between the screen 11 and the transverse member 9 so that they will not attempt to pass through this space.

While the features of construction shown and described, may be followed if desired, attention is again invited to the possibility of making variations within the scope of the invention as claimed.

I claim:—

1. A self-cleaning fish screen comprising a cylindrical under-shot water-driven screen extending across a spillway, a roller extending across the spillway directly under said screen, and mounting means for said screen and roller constructed to allow relative vertical movement thereof when material rotating with said screen strikes said roller.

2. A self-cleaning fish screen comprising a cylindrical under-shot water-driven screen extending across a spillway, a fixed transverse member upon the bottom of the spillway under said screen and spaced downwardly from the latter, a buoyant roller extending across the spillway at the upstream side of said transverse member and positioned to substantially close the space between said transverse member and said screen, mounting means for said screen, and mounting means for said roller constructed to allow downward shifting of said roller when struck by material rotating with said screen.

3. A self-cleaning fish screen comprising a cylindrical under-shot water-driven screen extending across a spillway, a roller extending across the spillway directly under said screen, mounting means for said roller, and mounting means for said screen constructed to allow upward shifting of said screen when material rotating with said screen strikes said roller.

4. A structure as specified in claim 1; together with means on the ends of said screen contacting with said roller for driving the same.

5. A self-cleaning fish screen comprising two standards against the side walls of a spillway, a fixed transverse member upon the bottom of the spillway and extending between the lower ends of said standards, a cylindrical under-shot water-driven screen extending between said standards and spaced upwardly from said transverse member, and a roller at the upstream side of said transverse member and positioned to substantially close the space between said transverse member and said screen, said screen and roller having trunnions, said standards being formed with vertical slots in which said trunnions are received, whereby said roller and screen may relatively move as required to allow passage between them of material rotating with the screen.

EDWIN DAMMAN.